United States Patent
Knee et al.

(10) Patent No.: US 8,908,093 B2
(45) Date of Patent: Dec. 9, 2014

(54) DETERMINING ASPECT RATIO FOR DISPLAY OF VIDEO

(71) Applicant: Snell Limited, Reading (GB)

(72) Inventors: Michael James Knee, Petersfield (GB); Maurice Snell, Petersfield (GB)

(73) Assignee: Snell Limited, Reading (GB)

( * ) Notice: Subject to any disclaimer, the term of this patent is extended or adjusted under 35 U.S.C. 154(b) by 0 days.

(21) Appl. No.: 13/742,191

(22) Filed: Jan. 15, 2013

(65) Prior Publication Data

US 2013/0194493 A1   Aug. 1, 2013

(30) Foreign Application Priority Data

Jan. 16, 2012   (GB) .................................. 1200654.0

(51) Int. Cl.
*H04N 7/01* (2006.01)
*H04N 11/20* (2006.01)

(52) U.S. Cl.
CPC ........... *H04N 7/0112* (2013.01); *H04N 7/0122* (2013.01)
USPC ........... 348/445; 348/441; 348/443; 348/446; 348/459; 348/556; 348/558; 348/563; 348/581; 348/719; 348/180; 725/93; 725/116

(58) Field of Classification Search
USPC ......... 348/445, 441, 443, 446, 556, 558, 581, 348/459, 563, 719, 180; 725/116, 93; 375/240.25
See application file for complete search history.

(56) References Cited

U.S. PATENT DOCUMENTS

| | | | |
|---|---|---|---|
| 5,956,092 A * | 9/1999 | Ebihara et al. ................. 348/445 |
| 2004/0071211 A1 * | 4/2004 | Washino ................... 375/240.01 |
| 2004/0114049 A1 | 6/2004 | Arora |
| 2006/0017843 A1 * | 1/2006 | Shi et al. ........................ 348/441 |
| 2007/0201833 A1 | 8/2007 | Cherna et al. |
| 2009/0310016 A1 * | 12/2009 | Fukuda et al. ................. 348/441 |
| 2011/0145878 A1 * | 6/2011 | Gronning ....................... 725/116 |
| 2012/0162505 A1 * | 6/2012 | Vanderhoff et al. ........... 348/441 |

OTHER PUBLICATIONS

Patents Act 1977: Search Report Under Section 17, dated May 16, 2012, issued in corresponding Application No. GB 1200654.9, filed Jan. 16, 2012, 1 page.

* cited by examiner

*Primary Examiner* — Jefferey Harold
*Assistant Examiner* — Mustafizur Rahman
(74) *Attorney, Agent, or Firm* — Christensen O'Connor Johnson Kindness PLLC

(57) ABSTRACT

The intended display aspect-ratio for video is determined automatically by analyzing an image to identify image blocks resulting from prior block-based processing of the video; comparing horizontal and vertical dimensions of those image blocks with horizontal and vertical dimensions of the image, with black border regions excluded as necessary; and determining from that comparison a display aspect ratio for the video.

16 Claims, 3 Drawing Sheets

DETERMINING ASPECT RATIO FOR DISPLAY OF VIDEO

FIELD OF INVENTION

This invention concerns analysis of digitally coded television images.

BACKGROUND OF THE INVENTION

Most standard interfaces for digital television signals do not require that the aspect-ratio (width to height ratio) of the displayed image is directly specified. In the absence of such a specification the aspect ratio is usually inferred from the context in which the data is presented, or from the spatial resolution of the image. For example, 'standard-definition' television is often assumed to have an aspect-ratio of 4:3; and 'high-definition' television is often assumed to have an aspect-ratio of 16:9. Some image coding standards avoid this ambiguity by specifying that 'the pixels are square'. That is to say that the horizontal and vertical spatial sampling frequencies are equal, and so the aspect ratio is equal to the ratio of the number of samples per active television line to the number of active lines per frame.

It is common for television images to be modified in 'aspect-ratio conversion' devices during the video production and editing process; this can give rise to ambiguity as to the intended ratio. These devices typically apply spatial scaling to the image. When an image is to be displayed on a display device that has an aspect-ratio different from that intended for the image data, there are two common alternative procedures that can be applied:

Blank pixels, comprising a 'black-band' or other uniform blank border (or two bands at opposite edges of the image), can be added to increase the image width or height so that the size of the image is increased (in one direction) to match the size of the display.

Pixels can be removed, or 'cropped' from one edge (or two opposite edges) of the image to reduce the image width or height to match the size of the display.

A number of methods of including an aspect-ratio definition in a video data-stream are in common use and have been standardized by bodies such as the SMPTE and ETSI. The inclusion of this 'metadata' with the image data enables processing equipment and display devices to adapt their mode of operation according to the aspect-ratio of the images being displayed or processed. However, the complexity of many image processing, video content production and distribution processes is such that errors can occur, leading to incorrect processing; and, such errors are often introduced by incorrect metadata.

Of course images can be checked by human observation, but this is neither economic nor practical in typical, large-scale television playout centers. There is thus a need for an automatic means of verifying that image data is appropriately scaled for the intended display, and that any aspect-ratio metadata associated with a video data stream accurately reflects the actual aspect-ratio of the respective image data. Where black-bands have been introduced, it can be inferred that the intended display has a different aspect ratio from the one for which the image data was originally intended. The position of the band, or bands, indicates the direction of aspect-ratio change. Measurement of the width of bands enables the magnitude of the change to be calculated.

European patent application EP 2107 521 discloses how a border region in an image can be identified; and, European patent EP 1 744 565 discloses how image data can be analyzed to detect black areas. These methods can be used to detect the presence of black-bands automatically, and this information can compared with metadata accompanying image data to assess the likely accuracy of that metadata.

However, where the image has been cropped in order to change its aspect-ratio these methods cannot be used. The present invention addresses this problem.

In this specification two exemplary aspect ratios—16:9 and 4:3—will be considered; the skilled reader will, of course, appreciate that there are other aspect ratios in use, and that the concepts described here are applicable to other ratios and combinations of ratios.

SUMMARY OF THE INVENTION

The invention consists in a method and apparatus for determining the intended display aspect-ratio for video data, in which the said video data is analyzed to detect the block dimensions used in prior block-based processing of that data, and the result of said analysis is used to determine the said intended display aspect-ratio.

Suitably, the detected block dimensions are compared with expected block dimensions for the said video data and: a narrower intended aspect-ratio is determined when the detected blocks are wider than expected; and, a wider intended aspect-ratio is determined when the detected blocks are higher than expected.

In some embodiments an original image spatial sampling format is detected: the number of samples per active line of the said original image format may be detected; or the number of television lines per frame of the said original image may be detected.

In some embodiments the said image data is analyzed to detect the presence of one or more blank borders and a detected border parameter is used to determine the said intended display aspect ratio.

Metadata may be derived from the video data and, in a preferred embodiment, derived metadata is compared with other metadata associated with the said video data.

In another aspect, the invention consists in a method of determining a display aspect ratio for video, comprising the steps of analyzing an image to identify image blocks resulting from prior block-based processing of the video; comparing horizontal and vertical dimensions of said image blocks with horizontal and vertical dimensions of the image; and determining from said comparison a display aspect ratio for the video.

BRIEF DESCRIPTION OF THE DRAWINGS

An example of the invention will now be described with reference to the drawings in which.

DETAILED DESCRIPTION OF THE INVENTION

Figure 1:
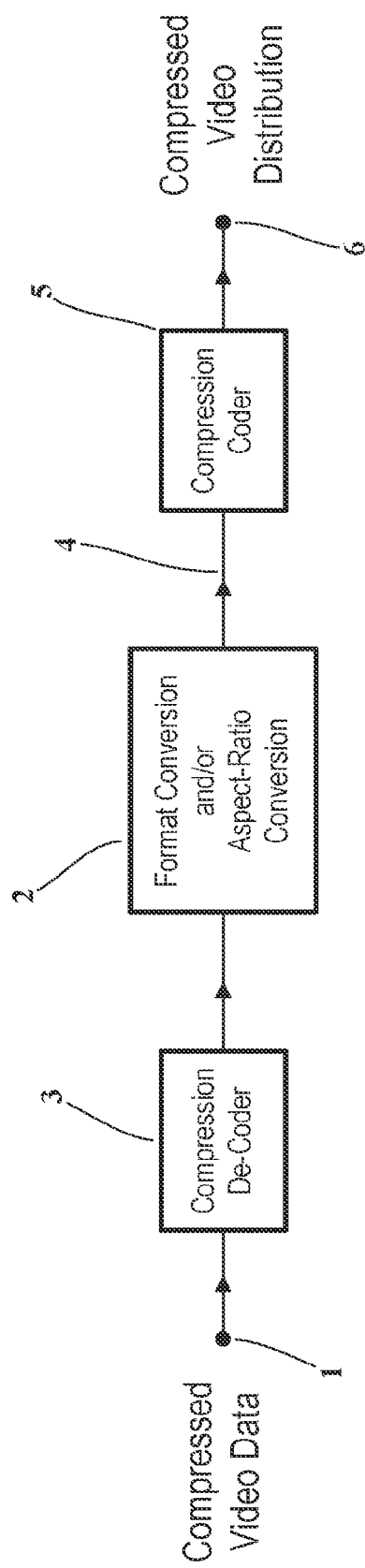
FIG. 1 shows a block diagram of a video process.

In modern video production and distribution, images are handled as compressed data streams wherever possible. FIG.

1 shows a small part of a typical video process. Compressed video data (1) is to be modified in a process (2) that converts it to a different format. This may include aspect-ratio conversion or standards conversion, and may be part of live playout operation, or a non-real-time "re-purposing" process that will create a video file for subsequent distribution. These re-scaling and re-sampling processes are virtually impossible to carry out in the compressed video domain, and so a compression decoder (3) converts the compressed video data (1) to a conventionally-sampled stream of pixel values prior to the process (2). The output (4) from the process is typically compressed again in a compression coder (5), to give a compressed video output for distribution (6). This output may be sent to a transmission network or a video file server.

Typically, block-based transform coding according to one of the MPEG family of standards is used for the compression. In block-based processing each frame is divided into equally sized rectangular regions, or blocks. Different coding decisions, for example different quantizations of transform coefficients, are applied to different blocks of the same frame. These different coding decisions lead to different coding artifacts in different blocks. Although these artifacts are usually imperceptibly small, the resulting changes in video quality between adjacent blocks can be detected by analysis of the decoded video signal.

U.S. Pat. No. 8,094,967 and International Patent Application WO2007/125286—which are both hereby herein incorporated by reference—disclose methods and apparatus for determining the horizontal and vertical block size corresponding to earlier block-based processing of video signals or data by detecting the transitions between the blocks. In the present invention block size measurement, such as described in this prior patent, is used to infer the intended aspect-ratio of an image. In the system of FIG. 1 a block size measurement carried out on the uncompressed video output (4) from the conversion process (2) can be used to determine how the aspect-ratio has been modified in the process (2). And, as will be explained below, additional information about the image format of the compressed video data (1) can be obtained.

Figure 2A:
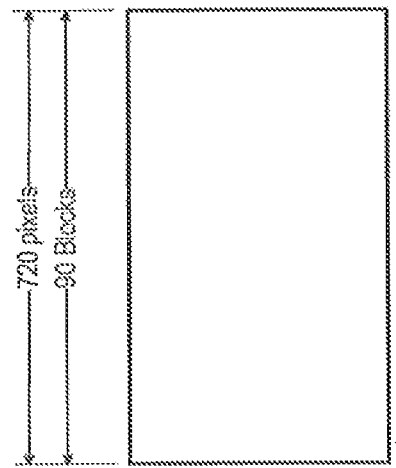
FIG. 2a shows a first embodiment of an image prior to aspect-ratio conversion.

FIG. 2a shows how a 16:9 aspect-ratio image (21) can be converted to a 4:3 aspect-ratio image (22) (FIG. 2b) by the removal of image-edge regions (23) and (24). FIG. 2c shows how a 4:3 aspect-ratio image (25) can be converted to a 16:9 aspect-ratio image (26) (FIG. 2d) by the removal of image-edge regions (27) and (28).

When images are compression coded the active image area is divided into a number of equally sized blocks; typically the blocks are eight pixels wide and eight television lines high. In the examples shown in FIGS. 2a-2d, the images are sampled at a spatial resolution of 720 pixels per active picture width and 576 lines per active picture height.

Figure 2B:
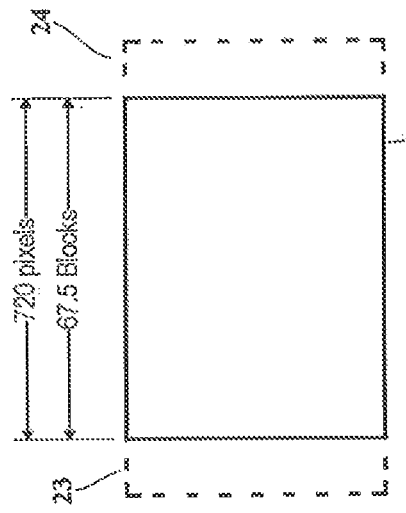
FIG. 2b shows aspect-ratio conversion of images of FIG. 2a by cropping.
Figure 2C:
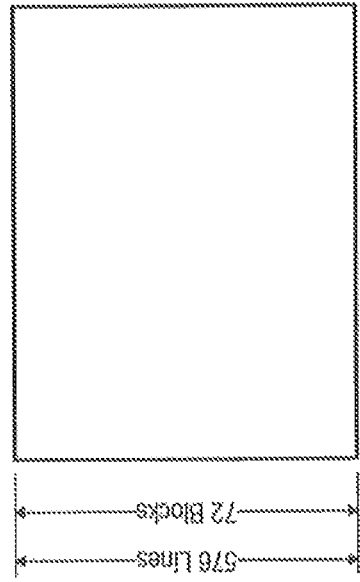
FIG. 2c shows a second embodiment of an image prior to aspect-ratio conversion.

In FIGS. 2a-2b, the 16:9 image (21) is 90 blocks wide because 720÷8 is 90. In the aspect-ratio conversion process the edge regions (23) and (24), which together comprise one quarter of the blocks on each line, are removed; the remaining image (22) comprises 67.5 blocks per line. This is re-scaled in the aspect ratio conversion process to an active picture width of 720 pixels. Thus the block width in the 4:3 image (22) is 720÷67.5, that is to say 10.667 pixels.

Figure 2D:
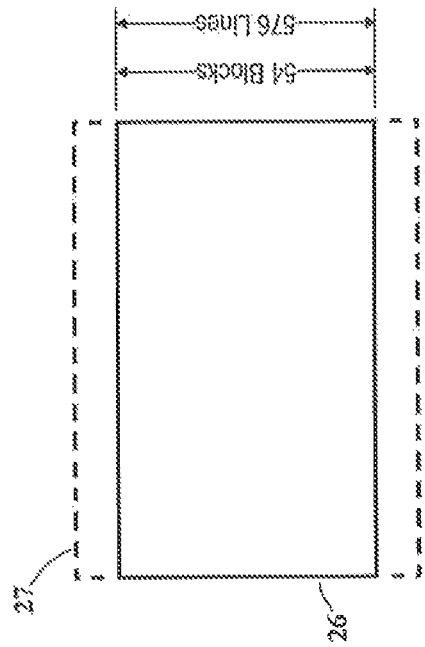
FIG. 2d shows an aspect ratio conversion of images of FIG. 2c by cropping.

In FIGS. 2c-2d, the 4:3 image (25) is 72 blocks high because 576÷8 is 72. In the aspect-ratio conversion process the edge regions (27) and (28), which together comprise one quarter of the rows of blocks, are removed; the remaining image (26) comprises 54 rows of blocks. This is re-scaled in the aspect ratio conversion process to an active picture height of 576 lines. Thus the block height in the 16:9 image (26) is 576÷54, that is to say 10.667 lines. Note that the cropping of the images has led to an increase in the block size in the direction of crop.

As mentioned previously, the conversion process (2) of FIG. 1 is likely to include standards conversion, which will typically involve spatial re-sampling of the image. At a point of measurement the spatial sampling structure of the image being measured is known, but the sampling structure at the point of compression coding may be unknown. However, because there are only a limited number of commonly-used combinations of aspect-ratio and sampling format, the block-size measurement usually enables both the original spatial sampling format and the original aspect-ratio to be determined.

The following tables show, for four common image formats, how a measured block height and block width can be used to infer the format and aspect ratio at the point of compression.

Table 1 applies to (nominally) 525-line standard definition images, spatially sampled with 480 active lines per frame, each active line comprising 720 pixels. This image format was historically defined to have an aspect ratio of 4:3, but is also now used to carry 16:9 images.

Table 2 applies to (nominally) 625-line standard definition images, spatially sampled with 576 active lines per frame, each active line comprising 720 pixels. This image format was historically defined to have an aspect ratio of 4:3, but is also now used to carry 16:9 images.

Table 3 applies to 720-active-line per frame high-definition images, each active line comprising 1280 pixels. This image format is conventionally defined to have an aspect ratio of 16:9.

Table 4 applies to 1080-active-line per frame high-definition images, each active line comprising 1920 pixels. This image format is conventionally defined to have an aspect ratio of 16:9.

TABLE 1

Measurement of 480 Active Line, 720 Pixels per Active Line Images
(Note this table typically applies to '525-line' standard-definition images)

| Measured Block Width (pixel pitches) | Measured Block Height (TV lines) | Conclusion (Aspect-Ratio) |
|---|---|---|
| 10.667 [67.5 blocks per line] | 8 [60 blocks per picture height] | 4:3 [16:9 Source with 480 active lines of 720 pixels] |
| 10.667 [67.5 blocks per line] | 6.667 [72 blocks per picture height] | 4:3 [16:9 Source with 576 active lines of 720 pixels] |
| 8 [90 blocks per line] | 10.667 [45 blocks per picture height] | 16:9 [4:3 source with 480 active lines of 720 pixels] |
| 8 [90 blocks per line] | 8.889 [54 blocks per picture height] | 16:9 [4:3 source with 576 active lines of 720 pixels] |
| 8 [90 blocks per line] | 6.667 [72 blocks per picture height] | Unknown, but same as source [Source had 576 active lines of 720 pixels] |
| 8 [90 blocks per line] | 8 [60 blocks per picture height] | Unknown, but same as source [Source had 480 active lines of 720 pixels] |
| 6 [120 blocks per line] | 5.333 [90 blocks per picture height] | 4:3 [16:9 Source had 1280 active lines of 720 pixels] |
| 5.333 [135 blocks per line] | 3.556 [135 blocks per picture height] | 4:3 [16:9 Source had 1080 active lines of 1440 pixels] |
| 4.5 [160 blocks per line] | 5.333 [90 blocks per picture height] | 16:9 [16:9 Source had 1280 active lines of 720 pixels] |

TABLE 1-continued

Measurement of 480 Active Line, 720 Pixels per Active Line Images
(Note this table typically applies to '525-line' standard-definition images)

| Measured Block Width (pixel pitches) | Measured Block Height (TV lines) | Conclusion (Aspect-Ratio) |
|---|---|---|
| 4 [180 blocks per line] | 3.556 [135 blocks per picture height] | Unknown [16:9 Source had 1080 active lines, either 1440 pixels or 1920 pixels] |
| 3 [240 blocks per line] | 3.556 [135 blocks per picture height] | 16:9 [16:9 Source had 1080 active lines of 1920 pixels] |

TABLE 2

Measurement of 576 Active Line, 720 Pixels per Active Line Images
(Note this table typically applies to '625-line' standard-definition images)

| Measured Block Width (pixel pitches) | Measured Block Height (TV lines) | Conclusion (Aspect-Ratio) |
|---|---|---|
| 10.667 [67.5 blocks per line] | 9.60 [60 blocks per picture height] | 4:3 [16:9 Source with 480 active lines of 720 pixels] |
| 10.667 [67.5 blocks per line] | 8 [72 blocks per picture height] | 4:3 [16:9 Source with 576 active lines of 720 pixels] |
| 8 [90 blocks per line] | 12.80 [45 blocks per picture height] | 16:9 [4:3 source with 480 active lines of 720 pixels] |
| 8 [90 blocks per line] | 10.67 [54 blocks per picture height] | 16:9 [4:3 source with 576 active lines of 720 pixels] |
| 8 [90 blocks per line] | 9.60 [60 blocks per picture height] | Unknown, but same as source [Source had 480 active lines of 720 pixels] |
| 8 [90 blocks per line] | 8 [72 blocks per picture height] | Unknown, but same as source [Source had 576 active lines of 720 pixels] |
| 6 [120 blocks per line] | 6.40 [90 blocks per picture height] | 4:3 [16:9 Source had 1280 active lines of 720 pixels] |
| 5.333 [135 blocks per line] | 4.27 [135 blocks per picture height] | 4:3 [16:9 Source had 1080 active lines of 1440 pixels] |
| 4.5 [160 blocks per line] | 6.40 [90 blocks per picture height] | 16:9 [16:9 Source had 1280 active lines of 720 pixels] |
| 4 [180 blocks per line] | 4.267 [135 blocks per picture height] | Unknown [16:9 Source had 1080 active lines of 1440 or 1920 pixels] |
| 3 [240 blocks per line] | 4.267 | 16:9 [16:9 Source had 1080 active lines of 1920 pixels] |

TABLE 3

Measurement of 720 Active Line, 1280 Pixels per Active Line Images
(Note that this is a high-definition format, and so a 16:9 aspect-ratio
can be assumed. The measurement characterizes the source.)

| Measured Block Width (pixel pitches) | Measured Block Height (TV lines) | Conclusion (Source Aspect-Ratio) |
|---|---|---|
| 14.222 [90 blocks per line] | 16 [45 blocks per picture height] | 4:3 [Source had 480 active lines of 720 pixels] |
| 14.222 [90 blocks per line] | 13.333 [54 blocks per picture height] | 4:3 [Source had 576 active lines of 720 pixels] |
| 14.222 | 12 | 16:9 |

TABLE 3-continued

Measurement of 720 Active Line, 1280 Pixels per Active Line Images
(Note that this is a high-definition format, and so a 16:9 aspect-ratio
can be assumed. The measurement characterizes the source.)

| Measured Block Width (pixel pitches) | Measured Block Height (TV lines) | Conclusion (Source Aspect-Ratio) |
|---|---|---|
| [90 blocks per line] | [60 blocks per picture height] | [Source had 480 active lines of 720 pixels] |
| 14.222 [90 blocks per line] | 10 [72 blocks per picture height] | 16:9 [Source had 576 active lines of 720 pixels] |
| 8 [160 blocks per line] | 8 [60 blocks per picture height] | 16:9 [Source had 720 active lines of 1280 pixels] |
| 7.111 [180 blocks per line] | 5.33 [135 blocks per picture height] | 16:9 [Source had 1080 active lines of 1440 pixels] |
| 5.333 [240 blocks per line] | 5.333 [135 blocks per picture height] | 16:9 [Source had 1080 active lines of 1920 pixels] |

TABLE 4

Measurement of 1080 Active Line, 1920 Pixels per Active Line Images
(Note that this is a high-definition format, and so a 16:9 aspect-ratio
can be assumed. The measurement characterizes the source.)

| Measured Block Width (pixel pitches) | Measured Block Height (TV lines) | Conclusion (Source Aspect-Ratio) |
|---|---|---|
| 21.333 [90 blocks per line] | 24 [45 blocks per picture height] | 4:3 [Source had 480 active lines of 720 pixels] |
| 21.333 [90 blocks per line] | 20 [54 blocks per picture height] | 4:3 [Source had 576 active lines of 720 pixels] |
| 21.333 [90 blocks per line] | 18 [60 blocks per picture height] | 16:9 [Source had 480 active lines of 720 pixels] |
| 21.333 [90 blocks per line] | 15 [72 blocks per picture height] | 16:9 [Source had 576 active lines of 720 pixels] |
| 12 [160 blocks per line] | 12 [90 blocks per picture height] | 16:9 [Source had 720 active lines of 1280 pixels] |
| 10.667 [180 blocks per line] | 8 [135 blocks per picture height] | 16:9 [Source had 1080 active lines of 1440 pixels] |
| 8 [240 blocks per line] | 8 [135 blocks per picture height] | 16:9 [Source had 1080 active lines of 1920 pixels] |

The above tables make use of the standardized characteristics of commonly-used image formats to infer the intended aspect-ratio from the measured block size. The tables assume that any aspect ratio conversion has been achieved by cropping the image in the manner illustrated in FIG. 1.

It is assumed that the source was processed with a blocks eight source pixels wide and eight source lines high. Detection of the positions of the edges of these blocks in the measured image enables vertical and horizontal re-scaling to be detected, because re-scaled blocks will not be both eight pixels wide and eight lines high in the rescaled image. Where the same sampling structure can be used with different aspect ratios, as is the case for standard-definitions formats, there can be ambiguity. In these cases some other information is required in order to determine the aspect ratio.

Where the measured block width corresponds to more than eight pixels, it can be concluded that the image has been horizontally enlarged. If the number of pixels per active line has not been increased in proportion to the enlargement then some part(s) of the image will have been lost. This is indicative of cropping of the image to fit a narrower intended aspect-ratio.

Where the measured block width corresponds to less than eight pixels, it can be concluded that the image has been horizontally reduced. If the image still fills the frame horizontally, then the rescaling factor and hence the original number of pixels per line can be computed.

Where the measured block height corresponds to more than eight lines, it can be concluded that the image has been vertically enlarged. If the number of lines per frame has not been increased in proportion to the enlargement then some part(s) of the image will have been lost. This is indicative of cropping of the image to fit a wider intended aspect-ratio.

Where the measured block height corresponds to less than eight lines, it can be concluded that the image has been vertically reduced. If the image still fills the frame vertically, then the rescaling factor, and hence the original number of lines per frame can be computed.

Figure 3:
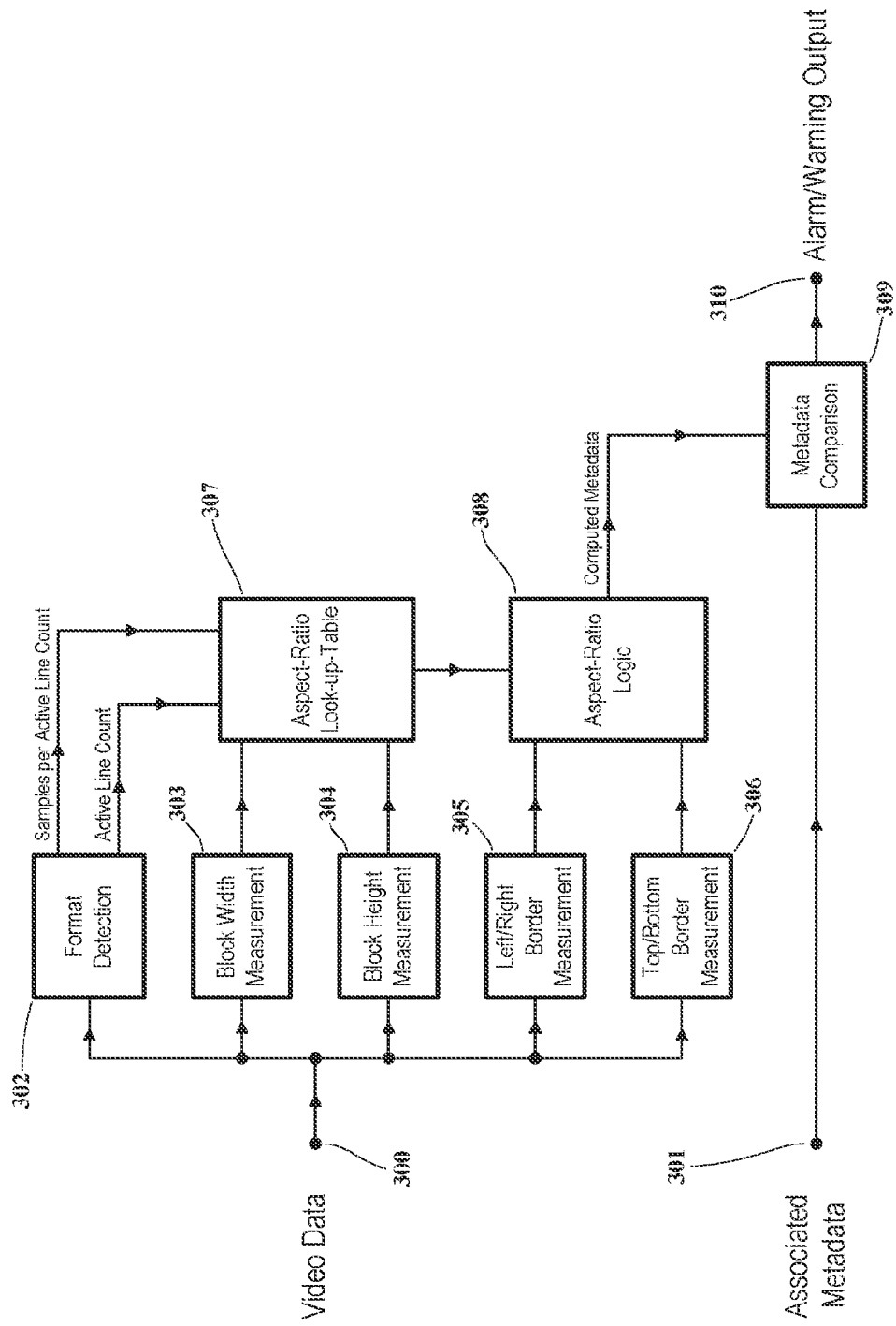
FIG. 3 shows a block diagram of a video monitoring process according to an embodiment of the invention.

A broadcast-plant monitoring system according to an embodiment of the invention is shown in FIG. 3. Uncompressed video data (300), and associated metadata (301) that describes, at least, the intended display aspect ratio of the video data (300), are input to the system. A format detection block (302) determines the width of the image represented by the video data (300) in pixels, and its height in television lines. As the skilled reader will appreciate, if the image data (300) contains timing reference signals according to one the well-known family of digital video interface standards such as ITU-R Recommendation 656, the width of the image may be determined by counting the number of samples between digital horizontal blanking (H) transitions, and the height of the image may be determined by counting the number of lines between the digital vertical blanking (V) transitions.

A block width measurement process (303) determines the block width, and a block height measurement process (304) determines the block height, of prior block-based processing of the video data (300). These measurements may use the method described in International Patent Application WO2007/125286, or some other method that detects the residue of block-based processing. One alternative is to calculate differences between pixels and then to sum those differences over the height and width of the image or a region of the image. An artifact of block based processing is that a pixel difference taken across two blocks is likely to be higher than that taken within a block. By looking for maxima in these sums of pixel differences and fitting those maxima to a regular array, measurements of block width and block height can be generated.

A left/right border measurement process (305) detects any blank borders at the side, and a top/bottom border measurement process (306) detects any blank borders at the top or bottom, of the image represented by the video data (300). These measurements may use one or both of the methods described in European patent application EP 2 107 521 and European Patent EP 1 744 565—both hereby herein incorporated by reference—or some other method that identifies blank regions at the edge of an image.

An aspect-ratio look-up-table (307) uses the image height and width outputs from the format detection block (32), the block size measurements from the block width measurement (303) and the block height measurement (304) to determine the likely intended display aspect-ratio of the video data (300). This image height and width enable one of the above Tables relating block size to aspect ratio to be selected, and the aspect-ratio corresponding to the measured block-size is then input to an aspect-ratio logic block (308), which determines the correct aspect ratio for the video data (300).

The aspect-ratio logic block (308) makes use of information about blank borders from the border measurement processes (305) and (306), and the output of the aspect-ratio look-up-table (307) to determine the intended aspect ratio. If there are no blank borders the aspect ratio output from the aspect-ratio look-up-table (307) will correspond to the intended ratio for the image. However, if any blank side borders are detected, the intended aspect-ratio can be assumed to be 16:9; and, if any top or bottom borders are detected the intended aspect-ratio can be assumed to be 4:3.

The intended aspect ratio from the aspect-ratio logic block (308) is expressed in a suitable metadata format and compared, in a metadata comparison block (309), with the input metadata (301) associated with the image data (300). If a difference is found between the aspect ratio determined by aspect-ratio logic block (308) and the aspect-ratio described by the metadata (301), a warning or alarm (310) is output from the metadata comparison block (309).

The above description of the operation of the aspect-ratio logic block (308), in which the information from block size measurement is not used if borders are detected, represents the simplest implementation. However, if resources permit, it can be helpful to check that the block size measurement is consistent with the aspect-ratio determined from border detection.

If one or both top/bottom borders are detected, the block width should be eight pixels if there has been no change to the number of pixels per active line.

If one or both left/right borders are detected, the block height should be eight lines if there has been not change to the number of lines per frame.

If one or both of the above bulleted paragraphs is found to be untrue, then an alarm or warning could be output to indicate that incorrect aspect-ratio modification may have been applied.

Image parameters other than the intended aspect-ratio can be determined. It can be seen from the above Tables 1 to 4 that the original number of samples per active line and number of active lines per frame can often be determined from the block size measurement, and this additional metadata can be output.

In the above description it has been assumed that the measurements are made at the uncompressed output from a format and/or aspect ratio conversion process, e.g. the point (4) in FIG. 1. It may also be necessary to determine the intended aspect ratio at a later point in a transmission or distribution chain where the modified video data has been compressed, i.e. the compressed video distribution (6) from the system of FIG. 1.

In this case, block edge detection systems will locate the blocks of the (second) compression coder (5). However, if the original coder's blocks are not aligned with those of the compression coder (5), two sets of block edges will be found. Fortunately, because the compressed data is available, the locations of the 'new' blocks will be known and these block edges can be ignored in the block size measurement. Of course, due allowance must be made for the possibility that some block edges due to the two compression (or other block-based) processes may coincide.

Note that any convenient method of measuring block size can be used. The block edges may be detected, or the horizontal and vertical spatial frequency components of the block structure may be detected and used to compute the distance, in pixels or lines, between adjacent blocks.

Images may be up- or down-sampled for analysis and the measured block or border sizes scaled to compensate for this up- or down-sampling.

It will be understood that this invention has been described by way of example only and that a wide variety of modifications or substitutions are possible without departing from the scope of the invention as claimed are possible. The use of a block size of 8 by 8 is commonplace but the skilled man will understand that this invention can by implemented with logic representing other block sizes. Such logic will readily be derived by analogy with the tables and other discussions above.

The invention claimed is:

1. A method for determining in a video processor the intended display aspect-ratio for video data, the method comprising:
   analyzing the video data to detect the block size used in prior block-based processing of that data;
   using the result of said analysis to determine the intended display aspect-ratio;
   detecting a block measurement; and
   comparing said block measurement with an expected block measurement for said video data.

2. The method according to claim 1 in which said detecting a block measurement includes detecting a block width, and said comparing said block measurement with an expected block measurement for said video data includes comparing said detected block width with an expected block width for the said video data.

3. The method according to claim 1 in which said detecting a block measurement includes detecting a block height and said comparing said block measurement with an expected block measurement for said video data includes comparing said detected block height with an expected block height for the said video data.

4. The method according to claim 1 in which an original image spatial sampling format is detected.

5. The method according to claim 1 in which a number of samples per active line of the said original image format is detected.

6. The method according to claim 5 in which the number of television lines per frame of the said original image is detected.

7. The method according to claim 1 in which the said image data is analyzed to detect the presence of one or more blank borders and a detected border parameter is used to determine the said intended display aspect ratio.

8. The A method according to claim 1, further comprising generating metadata representing the intended display aspect-ratio, as determined, for use in video monitoring.

9. The A method according to claim 8, further comprising comparing said metadata representing the intended display aspect-ratio with other metadata associated with the said video data.

10. Apparatus for determining the intended display aspect-ratio for video data in which the said video data is analyzed to detect the block size used in prior block-based processing of that data, the apparatus comprising:
    a block width measurement unit for measuring the width of blocks used in prior block-based processing of said video data;
    a block height measurement unit for measuring the height of blocks used in prior block-based processing of said video data; and
    an aspect-ratio determining unit receiving a block width measurement from said block width measurement unit and a block height measurement from said block height measurement unit to determine therefrom said intended display aspect-ratio.

11. The apparatus according to claim 10, further comprising a format detection unit in which an original image format is detected.

12. The apparatus according to claim 11 in which the number of samples per active line of the said original image format is detected.

13. The apparatus according to claim 11 in which the number of television lines per frame of the said original image is detected.

14. The apparatus according to claim 10, further comprising a border measurement unit in which the said image data is analyzed to detect the presence of one or more blank borders and a detected border parameter is provided to the aspect-ratio determining unit for use in determining said intended display aspect ratio.

15. The apparatus according to claim 10, further comprising a metadata output for metadata representing the intended display aspect-ratio as determined.

16. A non-transitory computer program product adapted to cause programmable apparatus to implement a method comprising:
    analyzing an image to identify image blocks resulting from prior block-based processing of the video;
    comparing horizontal and vertical dimensions of said image blocks with horizontal and vertical dimensions of the image; and
    determining from said comparison a display aspect ratio for the video.

* * * * *